UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

COMPOUND FOR FURNACE-LININGS AND FIRE-BRICK.

SPECIFICATION forming part of Letters Patent No. 265,070, dated September 26, 1882.

Application filed August 17, 1882. (No specimens.)

*To all whom it may concern:*

Be it known that I, JAMES HENDERSON, of Bellefonte, county of Centre, State of Pennsylvania, (formerly of New York city,) have made a new and useful invention of a Compound for Furnace-Linings and Fire-Brick, of which the following is such full, clear, and exact description as will enable others skilled in the art to make and use the same.

My invention relates to a compound of silica or sand, magnesia, and water for making furnace-linings or fire-brick.

In carrying out this invention I use the purer qualities of sea-sand, pulverized sandstone—such as is used in the manufacture of glass—or washed river-sand—such as is used for lining the hearths of furnaces used for heating iron, which is practically free of oxide of iron—or other substances that will form fusible compounds with the sand and magnesia at high temperatures. The sand or silica is preferably reduced to the fineness of flour, or so that it will pass through a sieve of about three thousand six hundred meshes to the square inch. The magnesia is also used in the form of flour, which is produced by calcining carbonate of magnesia to expel the carbonic acid, slaking or hydrating it with water, and drying and reducing it to flour. This is added to the silica or sand in the proportion of about five (5) per cent. of magnesia, by weight. The magnesia and silica may be mixed together in the dry state, and water enough added to make a thick mortar; or the magnesia may be mixed with water to the consistency of milk of magnesia and mixed with the sand, either way being productive of good results.

The compound thus produced may be applied to the bottoms and sides of reverberatory furnaces or as a lining to other metallurgic vessels, and dried by the atmosphere, when it is ready for use; or it may be molded into bricks, which are ready for use when dried, or, if preferred, may be burned in kilns. Linings and bricks thus made are hard and refractory, and neither expand nor contract at high temperatures.

I do not wish to be understood as limiting myself to the proportions of magnesia hereinbefore given, as good results may be obtained when up to fifteen (15) per cent. is used, or less, (to one per cent.) of the compound may be used. When more than about five per cent. is used the bricks are not so refractory, and when less is used they are more liable to expand at high temperatures.

I am aware that a compound of about ninety-five parts of silica and five parts of lime, with water, has been before used to make fire-brick of, and do not claim that compound.

Having thus described my invention, what I claim, and desire to secure by Letters Patent, is—

The compound for furnace-linings and fire-brick, consisting of silica, magnesia, and water, as specified and set forth.

JAMES HENDERSON.

Witnesses:
E. M. BLANCHARD,
J. IRWIN HAGERMAN.